(12) United States Patent
Cho

(10) Patent No.: US 7,553,056 B2
(45) Date of Patent: Jun. 30, 2009

(54) BACKLIGHT UNIT

(75) Inventor: Jung Ill Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/476,641

(22) Filed: Jun. 29, 2006

(65) Prior Publication Data

US 2007/0002584 A1    Jan. 4, 2007

(30) Foreign Application Priority Data

Jun. 30, 2005    (KR) ................ 10-2005-0058419

(51) Int. Cl.
*F21V 7/04*    (2006.01)
*H01J 5/16*    (2006.01)

(52) U.S. Cl. .............. 362/601; 362/632; 362/618; 362/614; 362/293; 313/110; 313/113; 313/115

(58) Field of Classification Search .......... 362/97, 362/241, 31, 614, 602, 632, 561, 260, 217, 362/223, 224, 166, 601, 293; 313/112, 504, 313/110, 113, 115

See application file for complete search history.

(56) References Cited

U.S. PATENT DOCUMENTS

| 3,787,238 | A | * | 1/1974 | Juliano | 250/488.1 |
| 4,276,633 | A | * | 6/1981 | Takami et al. | 368/227 |
| 5,396,406 | A | * | 3/1995 | Ketchpel | 362/27 |
| 5,479,328 | A | * | 12/1995 | Lee et al. | 362/216 |
| 6,348,763 | B1 | * | 2/2002 | Collins | 313/634 |
| 6,841,923 | B2 | * | 1/2005 | Liu et al. | 313/116 |
| 6,871,979 | B2 | * | 3/2005 | Mai | 362/241 |
| 2004/0032725 | A1 | * | 2/2004 | Hsieh et al. | 362/31 |
| 2005/0017619 | A1 | * | 1/2005 | Wan et al. | 313/112 |
| 2006/0056198 | A1 | * | 3/2006 | Choi et al. | 362/601 |
| 2006/0109643 | A1 | * | 5/2006 | Chang | 362/97 |
| 2006/0261733 | A1 | * | 11/2006 | Suzuki et al. | 313/504 |
| 2006/0291246 | A1 | * | 12/2006 | Hattori et al. | 362/614 |
| 2007/0018567 | A1 | * | 1/2007 | Hirosaki | 313/503 |
| 2007/0103059 | A1 | * | 5/2007 | Tsubata et al. | 313/504 |

FOREIGN PATENT DOCUMENTS

| CN | 1437054 A | 8/2003 |
| CN | 1591762 | 3/2005 |
| JP | 2001-266605 A | 3/2000 |

* cited by examiner

*Primary Examiner*—Jacob Y Choi
(74) *Attorney, Agent, or Firm*—McKenna Long & Aldridge LLP

(57) ABSTRACT

A backlight unit that converts ultraviolet light emitted from light-emitting lamps into visible light is disclosed. The backlight unit also reflects the visible light, thus achieving improved luminance. The backlight unit includes a plurality of light-emitting lamps arranged substantially in parallel, an outer case that fixes and supports the light-emitting lamps, and a reflection sheet disposed within the outer case and containing a fluorescent material that converts ultraviolet light into visible light and reflects the visible light.

2 Claims, 4 Drawing Sheets

BACKLIGHT UNIT

This application claims the benefit of Korean Patent Application No. 10-2005-0058419, filed on Jun. 30, 2005, which is hereby incorporated by reference for all purposes as if fully set forth herein.

BACKGROUND OF THE INVENTION

1. Field of the Invention

The present invention relates to a backlight unit, and more particularly, to a backlight unit including a reflection sheet that contains a fluorescent material sensitive to ultraviolet light.

2. Discussion of the Related Art

Many display devices have been developed and used. Of these devices, cathode ray tubes (CRTs) are mainly used in monitors of television (TV) sets, measuring instruments, information terminals, etc. However, CRTs do not have a small size and are not lightweight. A small size and a light weight are beneficial in electronic products. However, CRTs have a large size and are heavy in weight.

Currently, there is a desire for small and light electronic products, but it is difficult to reduce the weight and size of CRTs. Examples of display devices that are expected to replace CRTs include liquid crystal display (LCD) devices utilizing electro-optic effects, plasma display panels (PDPs) using gas discharge, and electroluminescence displays (ELDs) using electroluminescent effects. Currently, LCD devices are extensively being researched.

LCD devices are substitutes for CRTs because they advantageously have a small size, are lightweight and consume a low amount of power. LCD devices are flat panel display devices, and thus, are widely used in desktop computer monitors, laptop computers and large-scale information displays. Currently, there is a continuously increasing demand for LCD devices.

Because most related art LCD devices are non-emissive devices that regulate the intensity of incident light in order to display pictures and images, they essentially require the use of external light sources, such as backlight units, for irradiating light onto liquid crystal panels.

In most cases, backlight units are used as light sources in LCD devices and are classified into edge-type backlight units and direct-type backlight units. This classification depends on the arrangement of the cylindrical fluorescent lamps in backlight units.

In edge-type backlight units, a lamp unit is positioned at a lateral side of a light guide plate that guides light. The lamp unit includes a light-emitting lamp, a lamp holder inserted between both ends of the lamp to protect the lamp, and a lamp reflection plate surrounding the periphery of the lamp. One side of the lamp reflection plate is fitted into a lateral side of the light guide plate to reflect light emitted from the lamp toward the light guide plate.

Such edge-type backlight units, in which a lamp unit is positioned at a lateral side of a light guide plate, are mostly used in relatively small-sized LCD displays, including monitors of laptop and desktop computers. Edge-type backlight units have the advantages of good light uniformity and long life span. Furthermore, because edge-type backlight units are small, they enable the fabrication of thin LCD devices.

However, as the size of LCD devices is scaled up to 20 inches or above, direct-type backlight units are advantageous and are therefore being actively developed. In direct-type backlight units, a plurality of lamps is arranged in parallel below a diffusion plate so that light is directly irradiated over the entire surface of a liquid crystal panel.

Because direct-type backlight units have higher light availability than edge-type backlight units, they are mostly used in large-screen LCD devices that require high luminance.

LCD devices employing direct-type backlight units are used for a longer time and require a larger number of lamps when they are included in large-sized monitors and television sets as opposed to when they are included in laptop computers. As a result, lamps in direct-type backlight units frequently malfunction and have a short life span compared to the lamps in edge-type backlight units. The possibility that lamps are not properly turned on or off is larger in direct-type LCD devices than in edge-type LCD devices.

Suitable light sources for edge-type and direct-type backlight units include, for example, electroluminescence (EL) lamps, light-emitting diodes (LEDs), cold cathode fluorescent lamps (CCFLs), hot cathode fluorescent lamp (HCFLs), and external electrode fluorescent lamps (EEFLs).

A related art backlight unit will be explained with reference to FIGS. 1 and 2. FIG. 1 is a schematic view showing a related art direct-type backlight unit and FIG. 2 is a perspective view showing a reflection sheet used in the backlight unit of FIG. 1.

As shown in FIG. 1, the related art backlight unit for an LCD device includes a plurality of light-emitting lamps 1, an outer case 3 that fixes and supports the light-emitting lamps 1, and light scattering means 5a, 5b and 5c arranged between the light-emitting lamps 1 and a liquid crystal panel (not shown).

A reflection plate 7 is disposed within the outer case 3 to guide light emitted from the light-emitting lamps 1 toward a display portion of the liquid crystal panel.

The light-emitting lamps 1 may be cold cathode fluorescent lamps (CCFLs). Electrodes are disposed at both ends of a tube of each of the light-emitting lamps 1. When electricity is applied to the electrodes, the lamps begin to emit light. Both ends of the light-emitting lamps 1 fit into holes formed at both sides of the outer case 3.

Electric power leads 9 and 9a are linked to both electrodes of each of the light-emitting lamps 1 to deliver electricity required to drive the lamps 1. The electric power leads 9 and 9a are linked to respective connectors that are connected to a driving circuit. Accordingly, each of the light-emitting lamps 1 necessarily requires a separate connector.

Specifically, the electric power leads 9 and 9a linked to both electrodes of each of the light-emitting lamps 1 are linked to a single connector. One of the electric power leads 9 and 9a is bent below the outer case 3 so as to be linked to the connector.

The related art reflection sheet shown in FIG. 2 includes a colored layer 21, a polyethylene terephthalate (PET) layer 22, a pressure-sensitive adhesive layer 23, and a polyester layer 24. The polyester layer 24 contains an ultraviolet light stabilizer.

The colored layer 21 determines the front and the rear of the reflection sheet. Examples of the UV stabilizer include hydroxybenzophenones, benzotriazoles, substituted acrylates, and hindered amine light stabilizers (HALSs).

Referring to FIG. 2, the reflection sheet serves to diffuse or reflect visible light and absorb ultraviolet light emitted from the light-emitting lamps at the surface of the polyester layer 24.

As a result, the ultraviolet light emitted from the light-emitting lamps cannot be utilized without the reflection sheet. The reflection sheet of the related art direct-type backlight unit is configured to absorb ultraviolet light emitted from the light-emitting lamps, making it impossible to effectively utilize light emitted from the light-emitting lamps. Accordingly, improving the luminance of the backlight unit is limited.

Although a related art direct-type backlight unit equipped with cold cathode fluorescent lamps (CCFLs) has been described, the related art reflection sheet may also be used in direct-type backlight units equipped with external electrode fluorescent lamps (EEFLs). Therefore, improving the luminance of related art direct-type backlight units is limited.

SUMMARY OF THE INVENTION

Accordingly, the present invention is directed to a backlight unit that substantially obviates one or more problems due to limitations and disadvantages of the related art.

An advantage of the present invention is to provide a backlight unit that converts ultraviolet light emitted from light-emitting lamps into visible light and reflects the visible light, thus achieving improved luminance.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described, a backlight unit includes a plurality of light-emitting lamps arranged substantially in parallel, an outer case that fixes and supports the light-emitting lamps, and a reflection sheet disposed within the outer case and containing a fluorescent material that converts ultraviolet light into visible light and reflects the visible light.

In another aspect of the present invention, a reflection sheet includes a fluorescent material that converts ultraviolet light into visible light and reflects the visible light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principles of the invention. In the drawings.

DETAILED DESCRIPTION OF THE ILLUSTRATED EMBODIMENTS

Reference will now be made in detail to exemplary embodiments of the present invention, examples of which are illustrated in the accompanying drawings. Wherever possible, the same reference numbers will be used throughout the drawings to refer to the same or similar parts.

A backlight unit according to an embodiment of the present invention will be described with reference to FIGS. 3 and 4.

Figure 1:
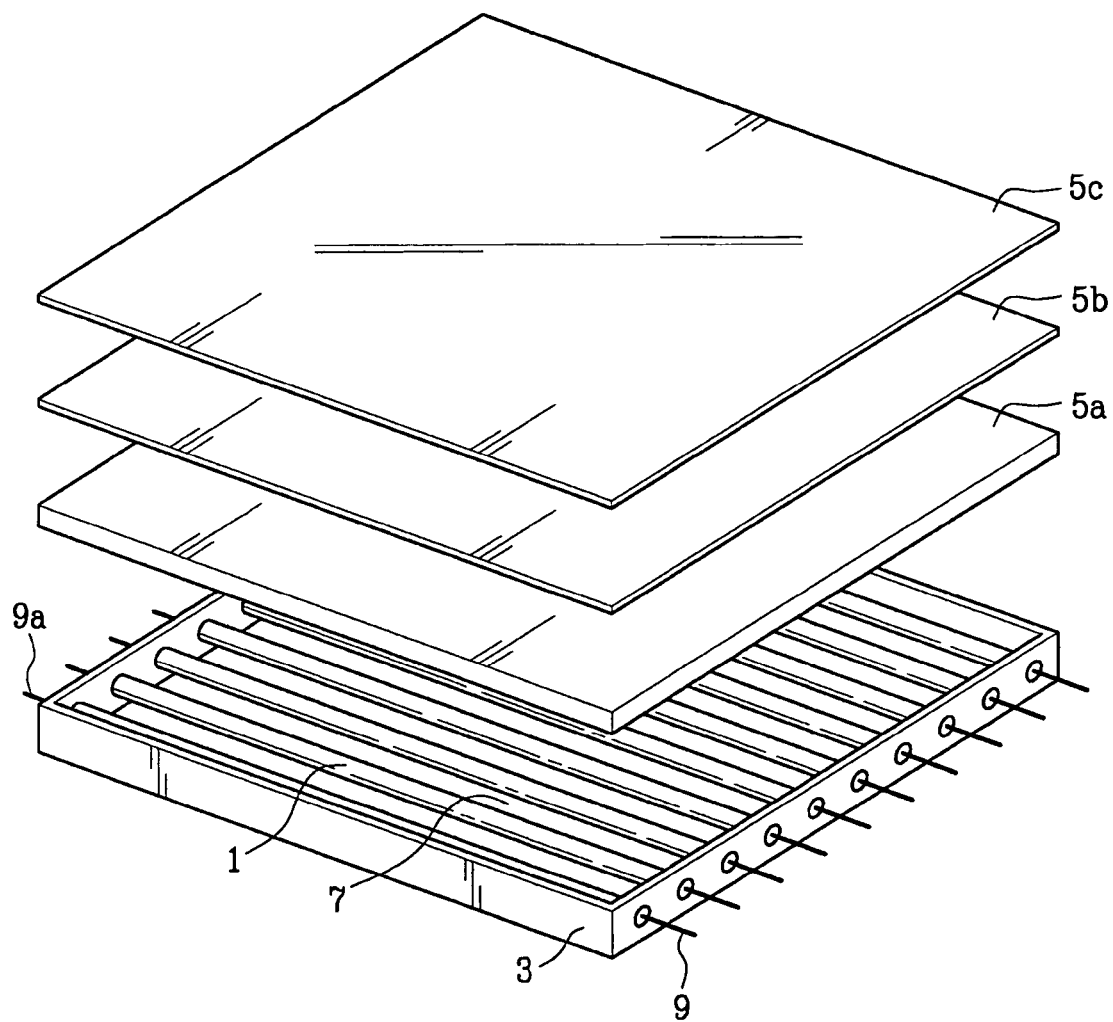
FIG. 1 is a schematic view showing a related art direct-type backlight unit.
Figure 2:
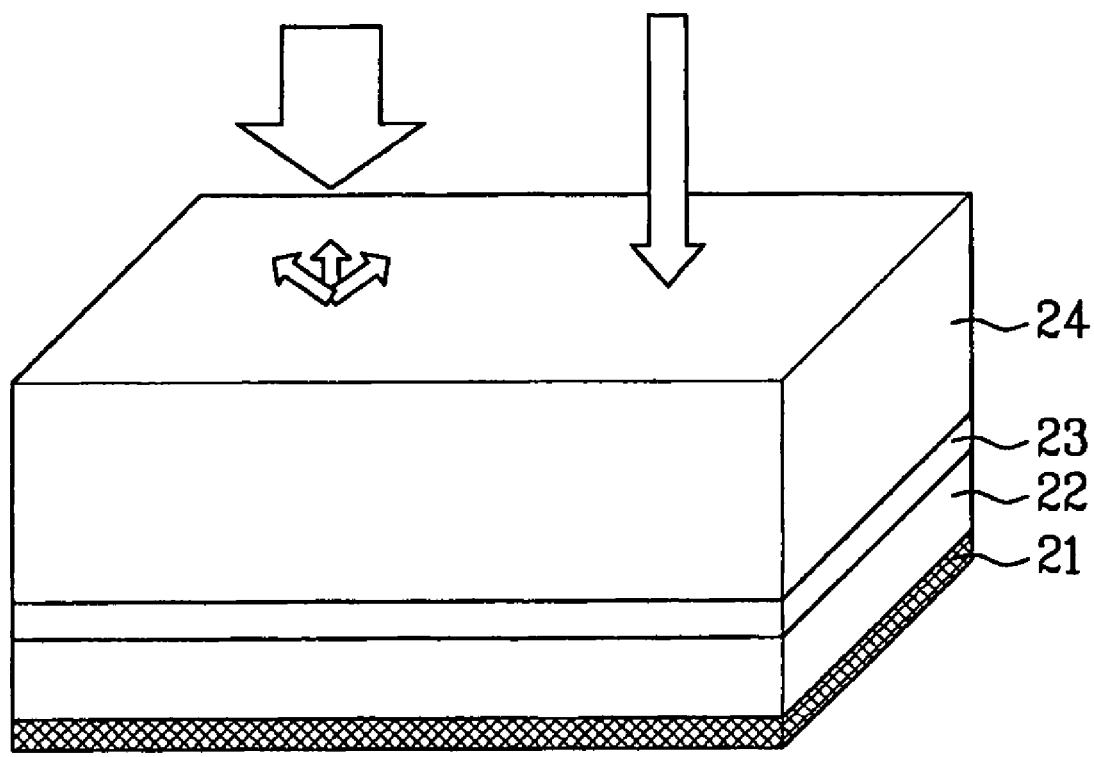
FIG. 2 is a perspective view showing a reflection sheet used in the backlight unit of FIG. 1.
Figure 3:
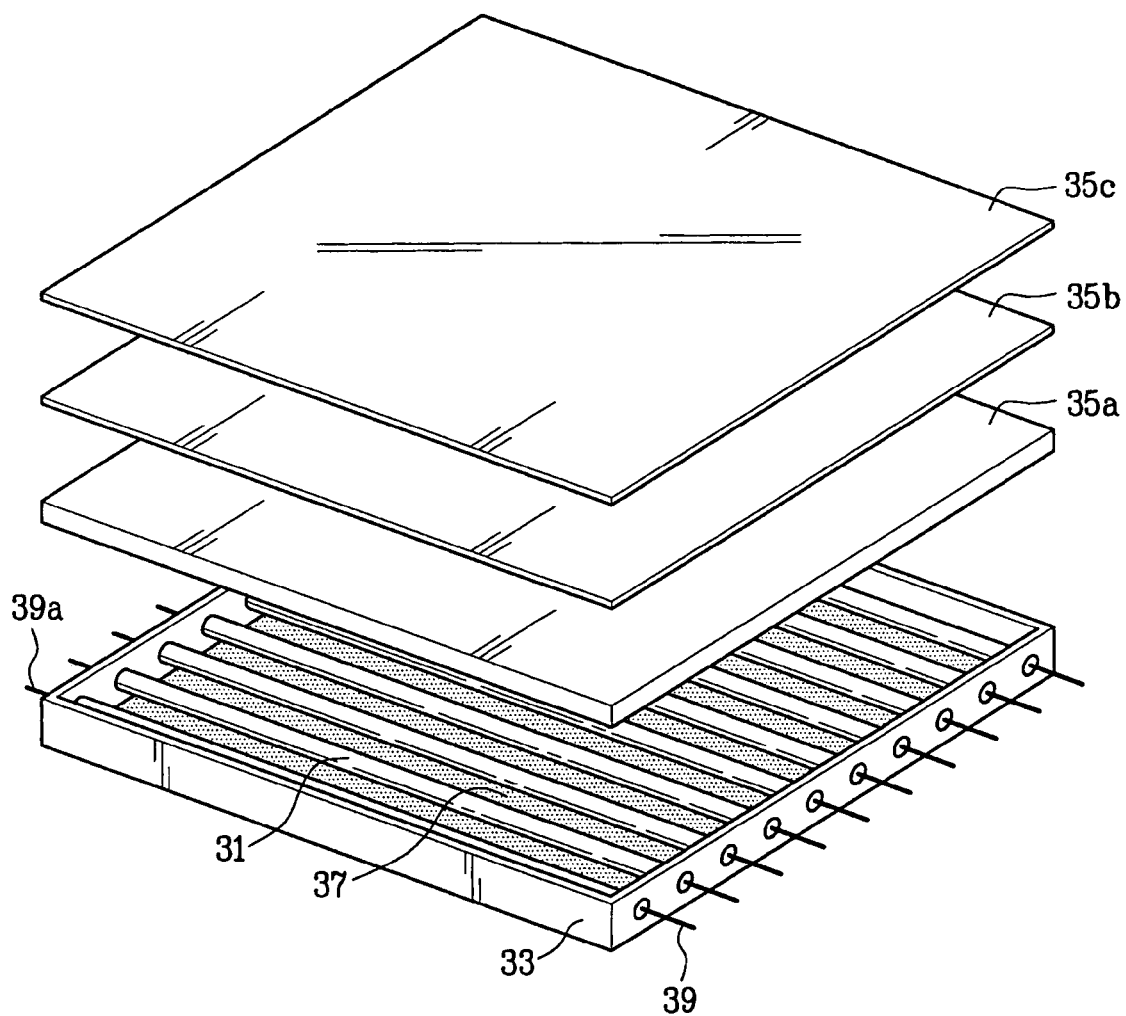
FIG. 3 is a schematic view showing a backlight unit according to an embodiment of the present invention.
Figure 4:
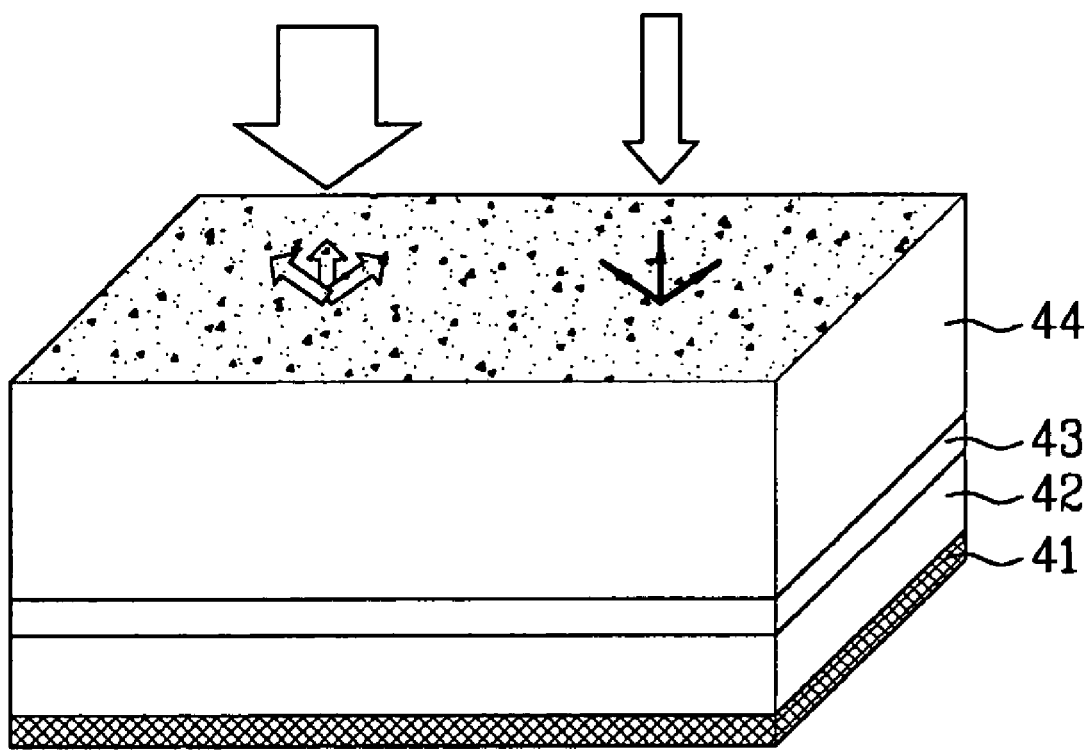
FIG. 4 is a perspective view showing a reflection sheet used in the backlight unit of FIG. 3.

FIG. 3 is a schematic view showing a backlight unit according to an embodiment of the present invention and FIG. 4 is a perspective view showing a reflection sheet used in the backlight unit of FIG. 3.

As shown in FIG. 3, the backlight unit for a liquid crystal display (LCD) device according to an embodiment of the present invention includes a plurality of light-emitting lamps 31 arranged substantially in parallel, an outer case 33 that fixes and supports the light-emitting lamps 31, and light scattering means 35a, 35b and 35c arranged between the light-emitting lamps 31 and a liquid crystal panel (not shown).

The light scattering means 35a, 35b and 35c prevent the shape of the light-emitting lamps from being displayed on a display screen of a liquid crystal panel. The scattering means 35a, 35b and 35c also provide light having uniform light intensity distribution. The light scattering means 35a, 35b and 35c may be a plurality of diffusion sheets and a diffusion plate arranged between the light emitting lamps 31 and the liquid crystal panel to enhance light scattering effects.

A reflection sheet 37 is disposed within the outer case 33 so that a concentration of both visible light and ultraviolet light emitted from the light-emitting lamps 31 are irradiated onto a display portion of the liquid crystal panel to maximize the availability of the light.

As shown in FIG. 4, the reflection sheet 37 includes a colored layer 41, a polyethylene terephthalate (PET) layer 42, a pressure-sensitive adhesive layer 43, and a polyester layer 44. The colored layer 41 determines the front and the rear of the reflection sheet 37.

The polyester layer 44 may be referred to as a "polymer base." The polyester layer 44 may include a synthetic or polymeric resin. Examples of the resin include polycarbonates and polymethylmethacrylates.

The reflection sheet 37 contains a fluorescent material sensitive to ultraviolet light. Thus, the reflection sheet 37 is sensitive to ultraviolet light leaking from the light-emitting lamp 31. For example, the ultraviolet light may have a wavelength in a wavelength range from about 310 nm to 380 nm.

The fluorescent material may be deposited or coated on the surface of the reflection sheet. The fluorescent material may be deposited or coated on the surface of the polyester layer 44. Alternatively, the fluorescent material may be directly incorporated into the polyester layer 44.

The fluorescent material contained in the reflection sheet 37 allows the reflection sheet 37 to convert ultraviolet light leaking from the light-emitting lamps 31 into visible light and to reflect the converted light upward.

In addition, due to the fluorescent material in the reflection sheet, both visible light and ultraviolet light are diffused and reflected at the surface of the polyester layer 44, as shown in FIG. 4.

The fluorescent material may be at least one compound selected from $SrGa_2S_4$:Eu, ZnS:CuAl, $Y_2O_2S$:Pr, $Gd_2O_2S$:Tb, $SrGa_2S_4$:Ce, $(La_2Gd)O_8$:Ce, $TbSr_6(PO_4)_8Cl$:Eu, ZnS:Ag, $CaSr_{1-x}S$:Eu, $Y_2O_8$:Eu, $Y_2O_2S$:Eu, and $(Y/Gd)_2O_2S$:Eu.

The light-emitting lamps 31 may be cold cathode fluorescent lamps (CCFLs) or external electrode fluorescent lamps (EEFLs). Electrodes are disposed at both ends of a tube of each of the light-emitting lamps 31. When electricity is applied to the electrodes, the lamps emit light. Both ends of the light-emitting lamps 31 fit into holes formed at both sides of the outer case 33.

As shown in FIG. 3, electric power leads 39 and 39a are linked to both electrodes of each of the light-emitting lamps 31 to deliver the electricity required to drive the lamps 31. The electric power leads 39 and 39a are linked to respective connectors that are connected to a driving circuit. Accordingly, each of the light-emitting lamps 31 necessarily requires a separate connector.

Specifically, the electric power leads 39 and 39a linked to both electrodes of each of the light-emitting lamps 31 are linked to a single connector. One of the electric power leads 39 and 39a is bent below the outer case 33 so as to be linked to the connector.

Although the present invention has been described with reference to a direct-type backlight unit equipped with cold cathode fluorescent lamps (CCFLs), the reflection sheet containing the fluorescent material may also be used in direct-type backlight units equipped with external electrode fluorescent lamps (EEFLs).

In the backlight unit of the present invention, because the fluorescent material contained in the reflection sheet allows the reflection sheet to convert ultraviolet light leaking from the light-emitting lamps into visible light and to reflect the visible light upward, the overall luminance of the backlight unit is improved considerably.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A backlight unit, comprising:
   a plurality of light-emitting lamps arranged substantially in parallel, wherein the light-emitting lamps are cold cathode fluorescent lamps (CCFLs) or external electrode fluorescent lamps (EEFLs);
   an outer case that fixes and supports the light-emitting lamps; and
   a reflection sheet disposed within the outer case and containing a fluorescent material that converts ultraviolet light into visible light and reflects the visible light, wherein the fluorescent material is at least one compound selected from ZnS:CuAl, ZnS:Ag;
   light scattering means including a plurality of diffusion sheets and a diffusion plate arranged between the light-emitting lamps and a liquid crystal panel;
   wherein the reflection sheet includes a polyethylene terephthalate (PET) layer, a pressure-sensitive adhesive layer, and a polyester layer sequentially laminated on a colored layer;
   wherein the polyester layer is a material selected from polycarbonates and polymethylmethacrylates;
   wherein the fluorescent material converts ultraviolet light having a wavelength in a range of about 310 nm to 380 nm;
   wherein the fluorescent material is deposited or coated on a surface of the polyester layer which is adjacent to the lamps.

2. A backlight unit, comprising:
   a plurality of light-emitting lamps arranged substantially in parallel, wherein the light-emitting lamps are cold cathode fluorescent lamps (CCFLs) or external electrode fluorescent lamps (EEFLs);
   an outer case that fixes and supports the light-emitting lamps; and
   a reflection sheet disposed within the outer case and containing a fluorescent material that converts ultraviolet light into visible light and reflects the visible light, wherein the fluorescent material is at least one compound selected from ZnS:CuAl, ZnS:Ag;
   light scattering means including a plurality of diffusion sheets and a diffusion plate arranged between the light-emitting lamps and a liquid crystal panel;
   wherein the reflection sheet includes a polyethylene terephthalate (PET) layer, a pressure-sensitive adhesive layer, and a polyester layer sequentially laminated on a colored layer;
   wherein the polyester layer is a material selected from polycarbonates and polymethylmethacrylates;
   wherein the fluorescent material converts ultraviolet light having a wavelength in a range of about 310 nm to 380 nm;
   wherein the fluorescent material is directly incorporated into the polyester layer which is adjacent to the lamps.

* * * * *